(No Model.) 2 Sheets—Sheet 1.
W. C. GIBBS.
PHOTOGRAPHIC CAMERA.
No. 394,353. Patented Dec. 11, 1888.
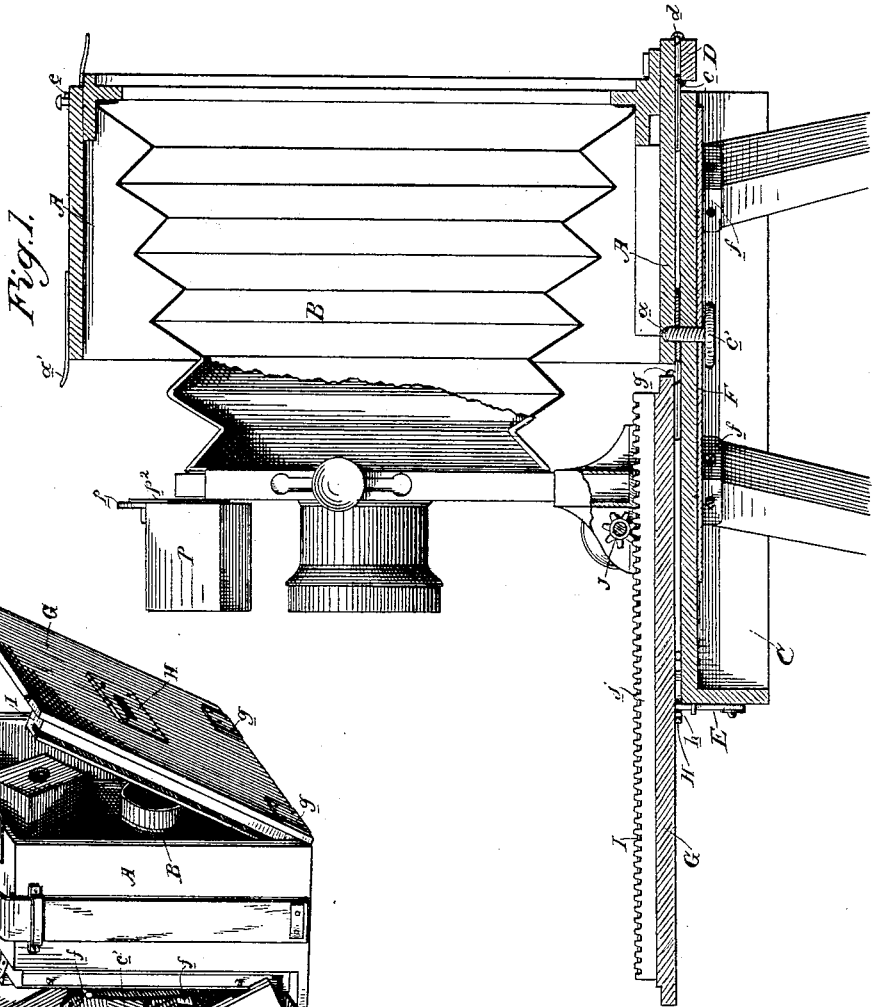
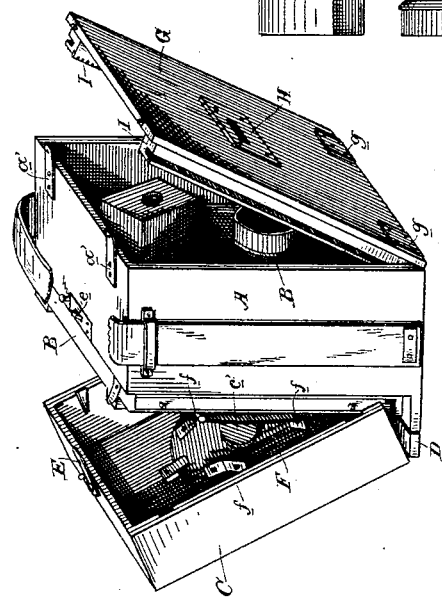
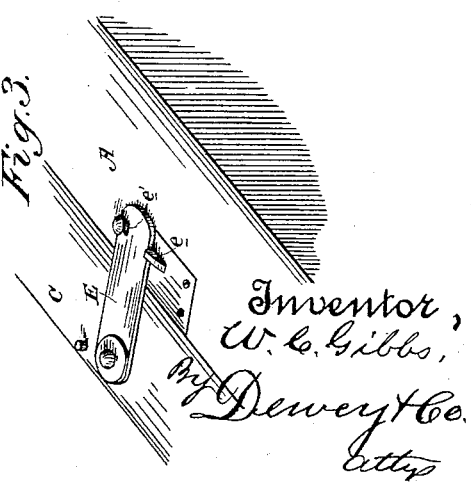
Witnesses,
Geo. H. Strong.
J. H. Strouse.
Inventor,
W. C. Gibbs,
By Dewey & Co.
Attys
N. PETERS, Photo-Lithographer, Washington, D. C.

(No Model.) 2 Sheets—Sheet 2.

W. C. GIBBS.
PHOTOGRAPHIC CAMERA.

No. 394,353. Patented Dec. 11, 1888.

Witnesses,
Geo. H. Strong.
J. H. Rouse

Inventor,
W. C. Gibbs.
By Dewey & Co.
Attys

UNITED STATES PATENT OFFICE.

WILLIAM C. GIBBS, OF OAKLAND, CALIFORNIA, ASSIGNOR OF ONE-HALF TO GEORGE W. DORNIN, OF SAME PLACE.

PHOTOGRAPHIC CAMERA.

SPECIFICATION forming part of Letters Patent No. 394,353, dated December 11, 1888.

Application filed April 18, 1888. Serial No. 271,084. (No model.)

*To all whom it may concern:*

Be it known that I, WILLIAM C. GIBBS, of Oakland, county of Alameda, State of California, have invented an Improvement in Photographic Cameras; and I hereby declare the following to be a full, clear, and exact description of the same.

My invention relates to the class of photographic cameras; and my invention consists in the novel construction and arrangement of the inclosing case, box, or frame, whereby its back and front plates, when dropped to expose the operative parts of the camera, are made to serve as the supporting-bed and the focusing-platform, respectively; in the novel adjusting and focusing carriage; in the adjustable support for the finder, and in details of construction and arrangement, all of which I shall hereinafter fully describe.

The main object of my invention is to provide a photographic camera which needs no separate box or case, having within itself parts which, ordinarily essential to its operation when in use, yet have the further function of completing a perfect case or box, so that the camera is self-contained.

Other objects are to provide improved constructions for focusing the lens and supporting the finder.

Figure 4:
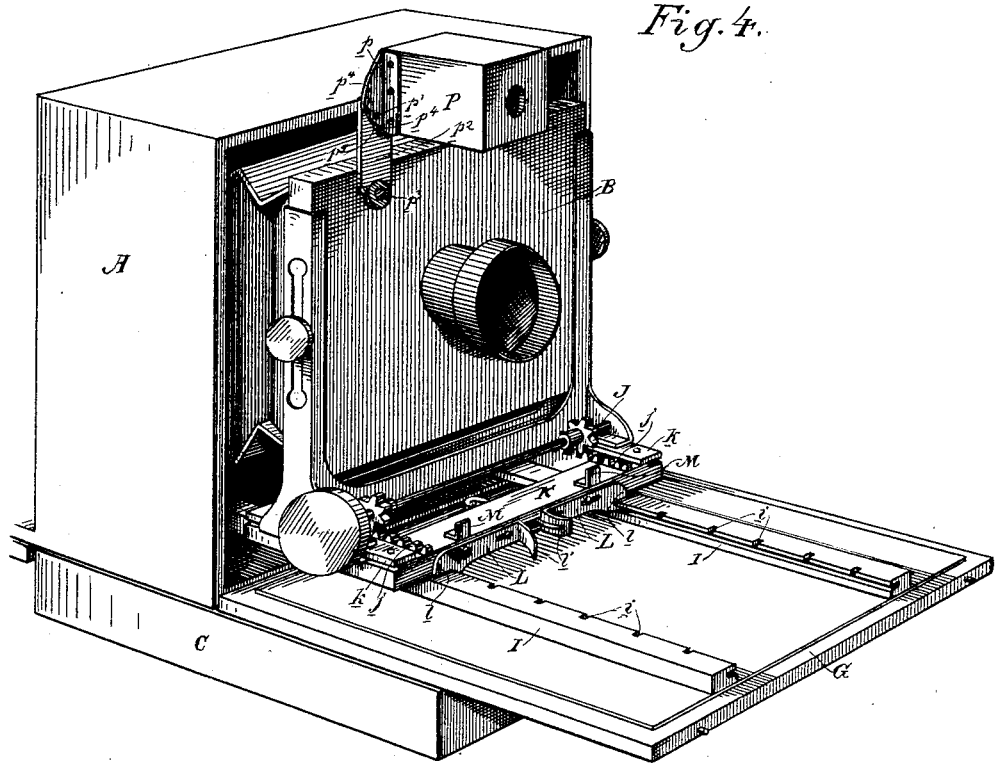
Figure 5:
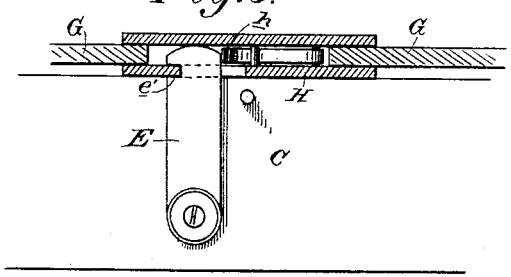

Referring to the accompanying drawings for a more complete explanation of my invention, Figure 1 is a vertical section of my camera, showing both end plates open and in position for use. Fig. 2 is a perspective view showing the end plates just being opened to expose the camera ends. Fig. 3 is a detail of latch E. Fig. 4 is a back view showing the finder-support and the focusing-carriage. Fig. 5 is a detail of the automatic catch between the two plates C and G.

A is the body of the camera box or case, consisting of a four-sided open-ended frame inclosing the ordinary parts of the camera, here represented, generally, by B, and including on one side the ground glass, on the other the front board, the lens and its connections, and between them the bellows.

C is the back of the case or box, consisting of a flanged plate adapted to fully cover and inclose the back of the camera. This back plate is connected with the base of the body-frame A by a suitable hinge-connection, which will permit said plate to be dropped down to expose the camera back and to be turned up under the body-frame for the latter to rest upon. In the present case I have here shown the connection as being made through the intervention of a strip, D, to which it is hinged at c, said strip being itself hinged at d to the base of the body-frame. Now when the back plate is in position to cover the camera-back the strip D lies in a horizontal position in the plane of the base of the body-frame, and the back plate occupies a vertical position, being secured by the engagement of a pivoted latch, E, on its top with a small catch, e, on the top of the body-frame.

In uncovering the camera-back the back plate, C, is dropped down to a horizontal position, turning on its hinges c; but to carry out the further function designed for the back plate its movement does not stop here; but, the camera being lifted, said back plate is carried on down and up again, turning with the strip D on the hinges d to a horizontal position in the other direction, so that it lies under and forms a bed-plate for the camera body-frame, projecting, however, forward of said frame, for a further purpose, which I shall presently describe. I do not confine myself to forming the hinge-connection between the back plate and the body-frame by the strip D, for with suitable hinges the proper movement of the back plate may be had without having the strip. The back plate, C, is firmly set in this position, wherein it serves as a bed by means of any suitable connection or clamp (here shown as a thumb-screw, c') mounted in the back plate and engaging a threaded socket, a, in the base of the body-frame. The back plate is provided on its under surface with the plate F, having the usual lugs, f, for securing the tripod-legs, so that said back plate becomes the support or foundation for the camera and is carried by the tripod.

G is the front plate of the body-frame of the camera box or case. It is hinged to the base of said body-frame at g, and when in an upright position it completely covers the front of the camera, being held by spring-catches a' above. By releasing these catches the front plate may be dropped down to a horizontal position, so that it then lies and is supported directly and firmly upon the back plate, C, which has been turned forward to serve as a bed, as heretofore described. In this position the front plate serves as a focusing-platform. In order to hold it solidly and firmly in this position I make use of the pivoted latch E of the back plate, causing it to engage a catch in the front plate, G. This engagement, though it may be of any suitable character, I have here shown as being made by a slotted plate, H, with which the notch $e'$ of the latch engages, and is pressed thereto by a spring-actuated toe-piece, $h$, operating behind the slot. The engagement is, therefore, automatic, and the disengagement is effected readily by pressing back the latch to relieve its notch of the slotted plate. The inner surface of the front plate, G, which becomes the upper surface when said plate is laid down, carries the tracks I, upon which the front of the camera is drawn out for focusing, its adjustment being effected by means of the common device of the pinion-shaft J and racks $j$. Instead, however, of this simple form of adjustment I would use, especially in larger cameras, the following construction: Upon the tracks I is mounted and adapted to slide a carriage-frame, K, having on each end the guides $k$, upon which the base of the front board of the camera is mounted, and is adjusted by means of the pinion-shaft J on the camera and the racks $j$ on the carriage-frame. In the inner edges of the tracks I are made notches $i$ at intervals, and upon the front of the carriage-frame are arranged the spring-controlled oppositely-working sliding latches L, the ends $l$ of which are adapted to engage the notches $i$ of the tracks in order to hold the carriage-frame solidly in position. The latches are readily operated by means of adjacent thumb-pieces $l'$. Now it will be seen that this construction provides for the primary or greater adjustment of the bellows by pulling out the carriage-frame K, with the front board and lens, to about the focus, as near as can be judged. Then the accurate adjustment is effected by the pinion-shaft operating on the racks $j$. This effects a saving of time over the ordinary method, and where the work being done requires the same focus the carriage may be drawn out directly to that focus at once and held by the spring-latches. M are safety-stops on the carriage-frame for limiting the adjustment of the camera front on said frame. By thus having the tracks on the front plate G, I avoid having a separate track-frame such as is usually employed.

P is the finder, of ordinary construction. My improvement in this connection consists in means for mounting it, whereby it may be turned to position for a vertical or horizontal picture. It has secured to one of its sides a plate, $p$, which is pivoted at $p'$ to a plate or arm, $p^2$, which is itself pivoted at $p^3$ to the camera front board. The edge of plate $p$ is cut out to form terminal shoulders at $p^4$, which, by coming in contact with a fixed pin, $p^5$, in the arm $p^2$, limit the movement of the finder in either direction and hold it in either a vertical or a horizontal position as it is turned on its pivot at $p'$. The turning of the arm $p^2$ on its pivot moves the finder down to be inclosed by the case or up above said case for use.

In a camera the focusing of which is effected by the backward movement of the bellows I have only to reverse the plates C and G, making the former the front plate and the latter the back plate.

It will be seen that by the construction of the camera as described I provide what I may term a "self-contained" apparatus—that is to say, I need no separate case or box. The parts of the apparatus which are necessary for setting it up preparatory to its use are parts of the inclosing box or case and have the double function described. There are no separate pieces to be mislaid or forgotten, no pieces to shake loose or rattle; but the apparatus as a connected whole is complete in itself whether in use or closed up.

Having thus described my invention, what I claim as new, and desire to secure by Letters Patent, is—

1. In a photographic camera, a plate forming one end cover of the camera-frame and hinged thereto, and adapted to be dropped down to expose the camera end, and turned under the camera-frame to form a bed or support therefor, substantially as described.

2. In a photographic camera, a plate forming one end cover of the camera-frame, in combination with a strip hinged to the base of the camera-frame, and hinged also to the cover-plate, whereby said plate is adapted to be dropped down to expose the camera end and turned under the camera-frame to form a bed or support therefor, substantially as described.

3. In a photographic camera, an inclosing body-frame having an open back, in combination with a plate covering said open back and hinged to the body-frame, whereby said plate is adapted to be dropped down to expose the camera back and turned under the body-frame to form a bed or support therefor, substantially as described.

4. In a photographic camera, an inclosing body-frame having an open back, and a strip hinged to the back of the base of said frame, in combination with a plate covering the open back of the body-frame and hinged to the strip, whereby said plate is adapted to be dropped down to expose the camera back and turned under the body-frame to form a bed or support therefor, substantially as described.

5. In a photographic camera, and in combination with an inclosing body-frame having an open back, a plate covering the open back and hinged to the body-frame, whereby it is adapted to be dropped down to expose the camera back and turned under the body-frame to form a support or bed therefor, and a fastening for holding the plate steady to and under the body-frame, substantially as described.

6. In a photographic camera, and in combination with an inclosing body-frame having an open back, a plate covering the open back and hinged to the body-frame, whereby it is adapted to be dropped down to expose the camera back and turned under the body-frame to form a bed or support therefor, and the thumb-screw in the plate and socket in the body-frame for clamping and holding the plate in place under the body-frame, substantially as described.

7. In a photographic camera, and in combination with an inclosing body-frame having an open back, a plate covering the open back and hinged to the body-frame, whereby it is adapted to be dropped down to expose the camera back and turned under the body-frame to form a bed or support therefor, a fastening for securing the plate to the body-frame, and the tripod-securing plate on the inner or under surface of the hinged back plate, substantially as described.

8. In a photographic camera, an open-ended body-frame, in combination with a plate forming one end of the body-frame and hinged thereto, whereby it is adapted to be turned down to expose the camera end and form a focusing-platform for its adjustment, and a plate forming the other end of the body-frame and hinged thereto, whereby it is adapted to be dropped down to expose that end of the camera and turned under the body-frame to form a bed or support therefor and for the other end plate, substantially as described.

9. In a photographic camera, an open-ended body-frame, in combination with a plate forming the front of the body-frame and hinged thereto, whereby it is adapted to be turned down to expose the camera front and form a focusing-platform for its adjustment, a plate forming the back of the body-frame and hinged thereto, whereby it is adapted to be dropped down to expose the camera back and turned under the body-frame to form a bed or support therefor and for the front plate, and an automatic catch-connection between the two plates to hold them firmly together, substantially as described.

10. In a photographic camera, an open-ended body-frame, in combination with a plate forming the front of the body-frame and hinged thereto, whereby it is adapted to be turned down to expose the camera front and form a focusing-platform for its adjustment, a plate forming the back of the body-frame and hinged thereto, whereby it is adapted to be dropped down to expose the camera back and turned under the body-frame to form a bed or support therefor and for the front plate, a fastening for holding the back plate solid under the body-frame, and a fastening for holding the two plates together, substantially as described.

11. In a photographic camera, the adjustable support for the finder, consisting of the plate secured to the finder and having opposing shoulders by which its movement is limited, and the arm pivoted to the front board of the camera and to the finder-plate and having a pin for coming in contact with the shoulders of said finder-plate, substantially as described.

12. In a photographic camera, the focusing or adjusting mechanism consisting of the carriage-frame on which the camera front is mounted and adapted to slide, the fixed tracks on which the carriage-frame moves, the notches in the tracks and latches on the carriage-frame for holding said frame to the position to which it is adjusted, and the pinion-shaft on the camera front and racks on the carriage-frame for adjusting the camera front on said carriage-frame, substantially as described.

In witness whereof I have hereunto set my hand.

WILLIAM C. GIBBS.

Witnesses:
JAMES MASON,
S. H. NOURSE.